United States Patent
Haitani (10) Patent No.: US 6,738,219 B2
(45) Date of Patent: May 18, 2004

(54) SEEK PATTERN FORMATION CIRCUIT (75) Inventor: Munehisa Haitani, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 443 days.

(21) Appl. No.: 09/946,017

(22) Filed: Sep. 4, 2001

(65) Prior Publication Data

US 2002/0027739 A1 Mar. 7, 2002

(30) Foreign Application Priority Data

Sep. 6, 2000 (JP) ........................................ 2000-270494

(51) Int. Cl.[7] ................................................ G11B 5/596
(52) U.S. Cl. ................................ 360/78.04; 360/78.13; 360/75; 360/78.01
(58) Field of Search ............................... 360/75, 78.01, 360/78.04, 78.13

(56) References Cited

U.S. PATENT DOCUMENTS

| | | | |
|---|---|---|---|
| 3,475,667 A | 10/1969 | Newell | |
| 4,544,964 A | * 10/1985 | Burns et al. | 360/51 |
| 4,612,442 A | * 9/1986 | Toshimichi | 250/353 |
| 5,581,421 A | 12/1996 | Aisawa | |
| 6,057,978 A | 5/2000 | Hayakawa | |
| 2002/0027737 A1 | * 3/2002 | Haitani | 360/75 |

FOREIGN PATENT DOCUMENTS

| | | |
|---|---|---|
| EP | 0 394 902 A1 | 10/1990 |
| JP | 6-176509 | 6/1994 |

* cited by examiner

*Primary Examiner*—David Hudspeth
*Assistant Examiner*—Jason Olson
(74) *Attorney, Agent, or Firm*—Brinks Hofer Gilson & Lione (57) ABSTRACT

A seek pattern formation circuit includes a seek pattern generation circuit for generating a seek pattern formed of a predetermined pulse train every time a step pulse is applied and a seek pattern shaping circuit for shaping the seek pattern and supplying the shaped seek pattern to a stepping motor driver. When the period for which the step pulse is supplied is shorter than the period for which the seek pattern is generated, and when at least one of pulses included in the seek pattern is very narrow, the seek pattern shaping circuit selectively eliminates the narrow pulse. As a result, narrow pulses which may induce noise are not supplied to the stepping motor driver, and hence a malfunction in the stepping motor driver does not occur.

28 Claims, 8 Drawing Sheets

| A | B | C | C' |
|---|---|---|----|
| L | L | L | L |
| L | L | H | L |
| L | H | L | L |
| L | H | H | H |
| H | L | L | L |
| H | L | H | H |
| H | H | L | H |
| H | H | H | H |

IF     A = B

THEN     C' = B

ELSE     C' = C

SEEK PATTERN FORMATION CIRCUIT

BACKGROUND OF THE INVENTION

1. Field of the Invention

The present invention relates to seek pattern formation circuits, and more particularly relates to a seek pattern formation circuit which includes a seek pattern shaping circuit for selectively eliminating narrow pulses when a step pulse period is shortened and some pulses included in a predetermined pulse train forming a seek pattern become very narrow.

2. Description of the Related Art

In general, in floppy disk drives (FDDs) and the like, a stepping motor, which is driven by a stepping motor driver, is used to move a head to a predetermined writing or reading position on a floppy disk. A seek pattern formation circuit is used to energize the stepping motor driver.

Figure 7:
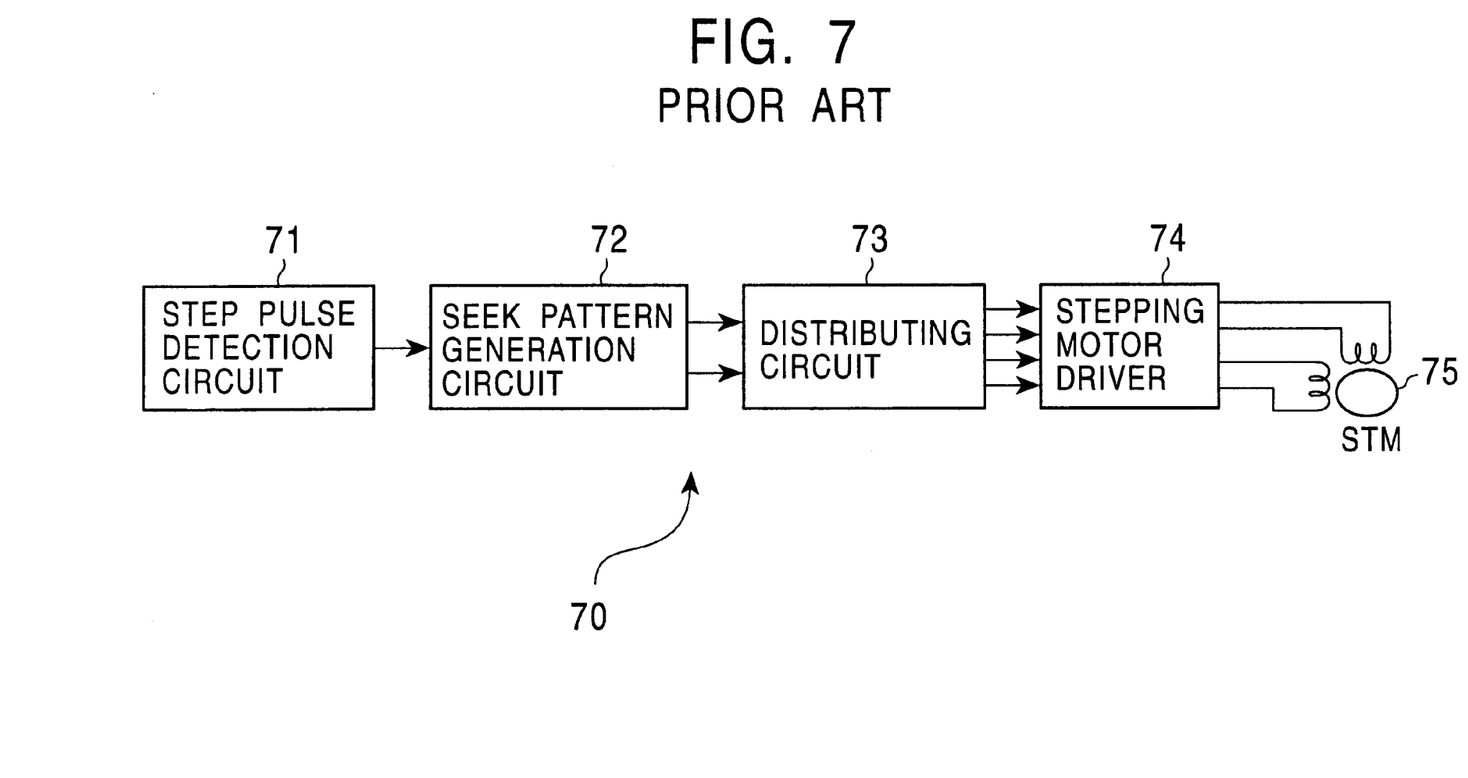
FIG. 7 is a block diagram of a conventional seek pattern formation circuit.

FIG. 7 shows an example of the structure of a conventional seek pattern formation circuit.

As shown in FIG. 7, a seek pattern formation circuit 70 includes a step pulse detection circuit 71 for detecting a step pulse supplied from a host computer (not shown) and outputting the step pulse; a seek pattern generation circuit 72 for generating a seek pattern formed of a plurality of predetermined pulses, that is, a pulse train, every time the step pulse is applied; and a distributing circuit 73 for distributing and supplying the seek pattern to a stepping motor driver 74. The stepping motor driver 74 rotates and drives a stepping motor (STM) 75 in response to the supplied seek pattern.

Figure 8:
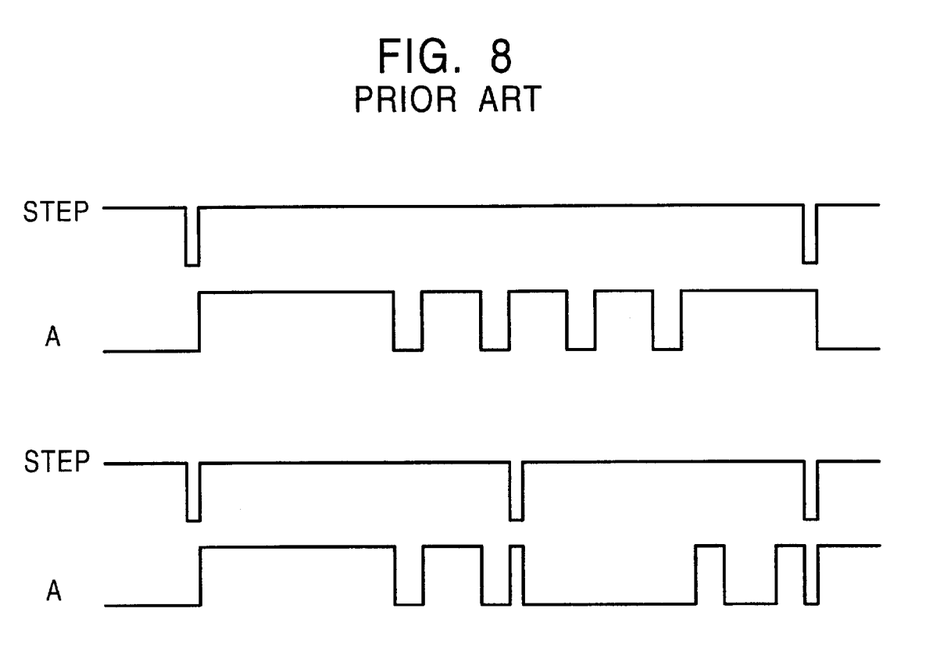
FIG. 8 includes signal waveform diagrams showing seek patterns output from the conventional seek pattern formation circuit.

FIG. 8 includes waveform diagrams showing examples of seek patterns output from the seek pattern formation circuit 70.

Referring to FIG. 8, a first waveform and a third waveform from the top show waveforms of step pulses (STEPs) which are supplied to the seek pattern generation circuit 72. A second waveform and a fourth waveform from the top show waveforms of seek patterns (A) which are output from the seek pattern generation circuit 72. Concerning the first and second waveforms from the top, the period for which the step pulse is applied is longer than the period for which the seek pattern is generated. Concerning the third and fourth waveforms from the top, the period for which the step pulse is applied is shorter than the period for which the seek pattern is generated.

As shown in FIG. 8, the seek pattern generation circuit 72 generates and outputs a new seek pattern every time a step pulse is applied. Every time the step pulse is applied, the polarities of pulses in the seek pattern are inverted.

In the conventional seek pattern formation circuit 70, a step pulse supplied from the step pulse detection circuit 71 to the seek pattern generation circuit 72 is obtained in response to the step pulse detection circuit 71 detecting the step pulse supplied thereto from the host computer (not shown). The step pulse period does not correspond to the operating period of the FDD. As a result, the period for which the step pulse is applied to the seek pattern generation circuit 72 may be less than the period for which the seek pattern is generated.

For example, as indicated by the first and second waveforms from the top in FIG. 8, when the period for which the step pulse is applied is longer than the period for which the seek pattern is generated, the seek pattern generation circuit 72 generates all of the pulses forming the seek pattern every time the step pulse is supplied and supplies the normal seek pattern to the stepping motor driver 74 through the distributing circuit 73. In contrast, as indicated by the third and fourth waveforms from the top in FIG. 8, the period for which the step pulse is applied is shortened. Thus, the period for which the step pulse is applied is shorter than the period for which the seek pattern is generated. In this case, the seek pattern generation circuit 72 sequentially generates pulses forming the seek pattern every time the step pulse is supplied. Since the next step pulse is supplied before all the pulses forming the seek pattern are generated, the seek pattern output from the seek pattern generation circuit 72 may have less pulses than the normal pattern. Not only is the number of pulses smaller, but also the last pulse width may be narrower than the normal pulse width.

In the conventional seek pattern formation circuit 70, when the output seek pattern is supplied to the stepping motor driver 74, and when pulses having a width which is much narrower than the normal pulse width are included in the seek pattern, the narrow pulses may induce noise, and this in turn may cause a malfunction in the stepping motor driver 74.

SUMMARY OF THE INVENTION

Accordingly, it is an object of the present invention to provide a seek pattern formation circuit capable of eliminating, from an output seek pattern, pulses having a width which is much narrower than the normal pulse width when the period for which the seek pattern is generated becomes shorter than the period for which the step pulse is applied.

In order to achieve the foregoing objects, a seek pattern formation circuit according to the present invention includes a seek pattern generation circuit that generates a seek pattern having a predetermined pulse train every time a step pulse is applied. The pulse train includes pulses having normal pulse widths. A seek pattern shaping circuit shapes the seek pattern output from the seek pattern generation circuit and supplies the seek pattern to a stepping motor driver. When the period for which the step pulse is supplied becomes shorter than the period for which the seek pattern is generated, and when at least one of the pulses included in the pulse train of the seek pattern becomes narrower than the normal width of that pulse, the seek pattern shaping circuit selectively eliminates the at least one narrow pulse.

Accordingly, when the period for which the step pulse is applied becomes shorter than the period for which the seek pattern is generated, and when a pulse having a width which is much narrower than a predetermined pulse width is included in the seek pattern output from the seek pattern generation circuit, the seek pattern shaping circuit is connected to the output side of the seek pattern generation circuit, and hence the seek pattern shaping circuit eliminates only a narrow pulse. Accordingly, a narrow pulse, which may induce noise, is prevented from being supplied to the stepping motor driver, and hence a malfunction in the stepping motor driver is prevented.

The narrow pulse may have a width narrower than the width of two clock pulses or may have may a width narrower than one clock pulse.

The seek pattern shaping circuit may also comprise feedback between an output of the seek pattern shaping circuit and the seek pattern shaping circuit. The seek pattern may be shaped only when the predetermined frequency of the applied step pulses is higher than the frequency at which the seek pattern is generated.

Accordingly, it is possible to eliminate only a very narrow pulse, from among narrow pulses, which may cause induced noise.

DESCRIPTION OF THE PREFERRED EMBODIMENTS

Figure 1:
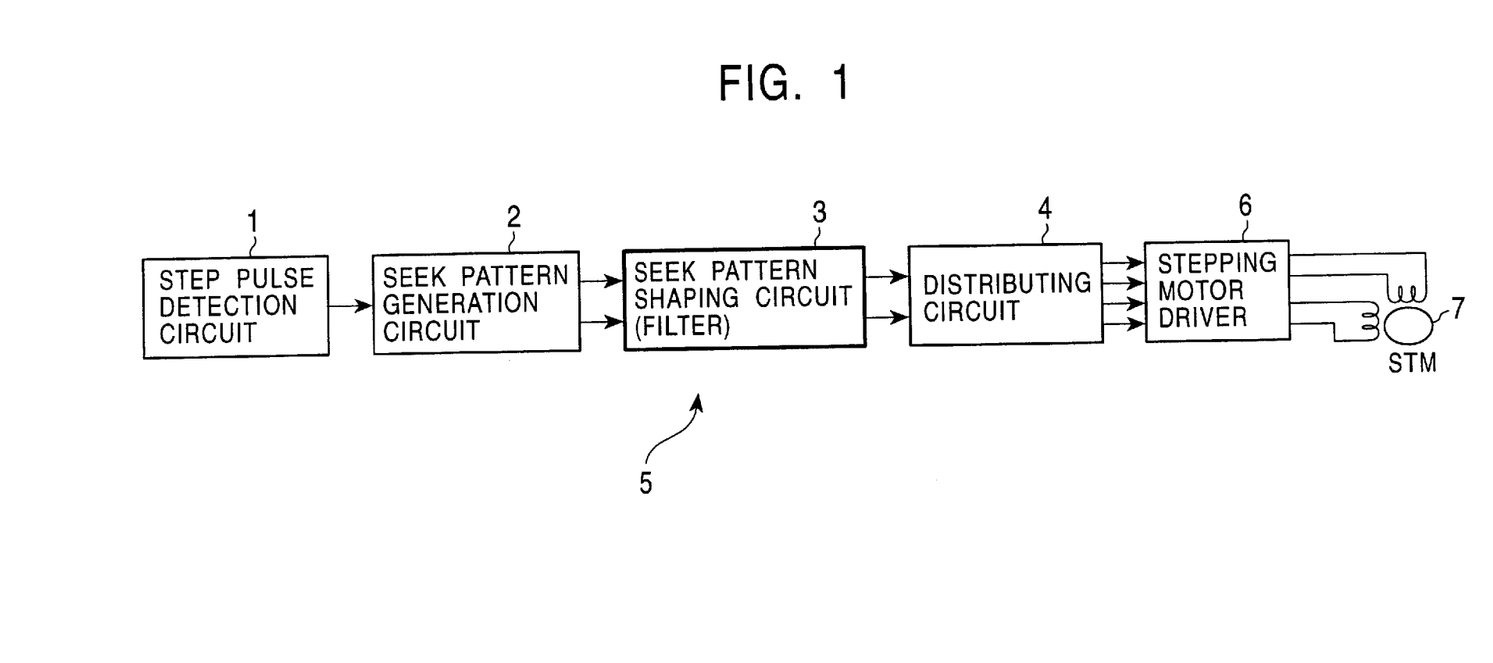
FIG. 1 is a block diagram of the structure of a seek pattern formation circuit according to an embodiment of the present invention, in which main portions of the structure are illustrated.

FIG. 1 shows the structure of a seek pattern formation circuit according to an embodiment of the present invention, in which main portions of the structure are illustrated.

As shown in FIG. 1, a seek pattern formation circuit 5 includes a step pulse detection circuit 1 that detects at least one step pulse of successive step pulses supplied from a host computer (not shown). For example, the step pulse detection circuit may detect every step pulse. A seek pattern generation circuit 2 generates a seek pattern formed of a plurality of predetermined pulses, that is, a pulse train. The seek pattern generation circuit 2 may receive successive step pulses and generate a predetermined pulse train of pulses in response to each step pulse. A seek pattern shaping circuit 3 eliminates only extremely narrow pulses in the seek pattern. A distributing circuit 4 distributes and supplies the seek pattern to a stepping motor driver 6. Compared with the conventional seek pattern formation circuit 70 shown in FIG. 7, the seek pattern formation circuit 5 includes the seek pattern shaping circuit 3. In the seek pattern formation circuit 5, the stepping motor driver 6 rotates and drives a stepping motor (STM) 7 in response to the supplied seek pattern.

Figure 2A:
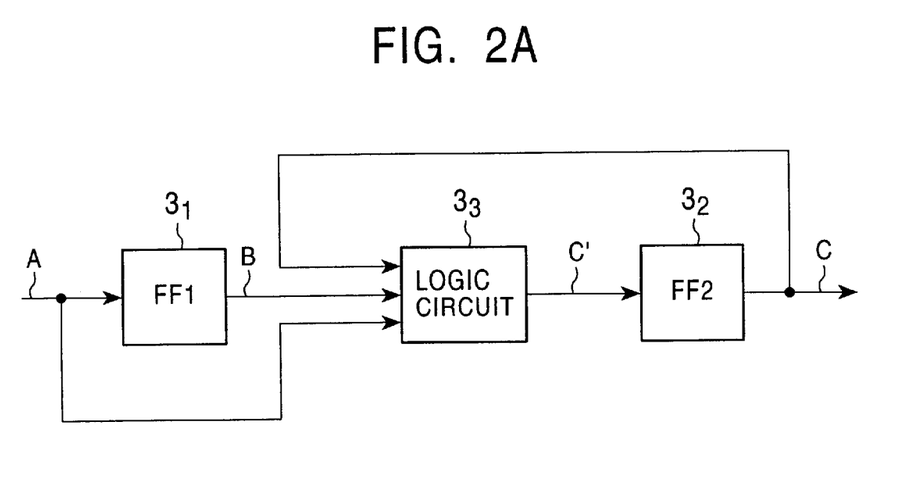
FIG. 2A illustrates details of the structure of a seek pattern shaping circuit shown in FIG. 1.
Figure 2B:
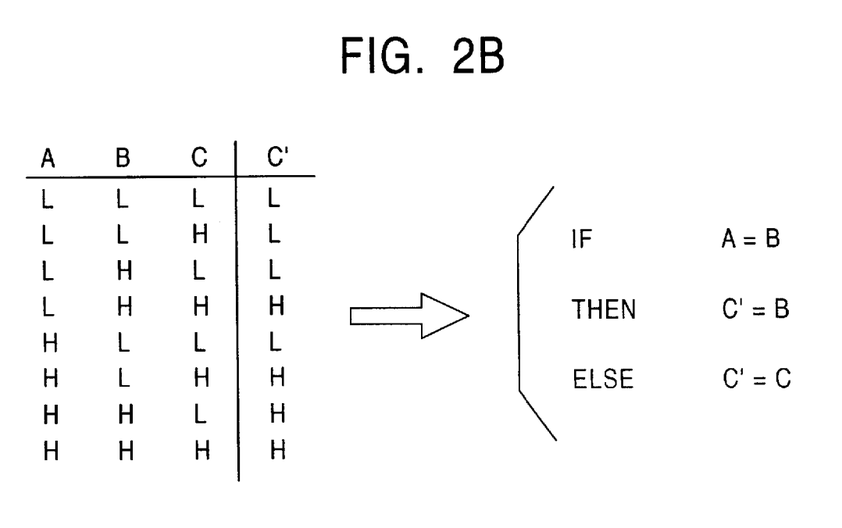
FIG. 2B illustrates logical states based on signals at various locations of the circuit in FIG. 2A.

FIG. 2A shows details of the structure of the seek pattern shaping circuit 3 shown in FIG. 1. FIG. 2B shows logical states of signals at various locations of the circuit in FIG. 2A. In FIG. 2A, only one of two channel systems is shown (the other channel system is not shown) in order to simplify the description.

As shown in FIG. 2A, the seek pattern shaping circuit 3 includes a first flip flop (FF1) $3_1$, a second flip flop (FF2) $3_2$, and a logic circuit $3_3$. The use of only two flip flops and a logic circuit permits the seek pattern shaping circuit 3 to be implemented with simplicity and ease. Although discrete devices are illustrated in FIG. 2A, a single integrated circuit may also be used.

A data input of the first flip flop $3_1$ is connected to a seek pattern input terminal, and a non-inverted output of the first flip flop $3_1$ is connected to a first input of the logic circuit $3_3$. A second input of the logic circuit $3_3$ is connected to a seek pattern output terminal, and a third input of the logic circuit $3_3$ is connected to the seek pattern input terminal. A data input of the second flip flop $3_2$ is connected to an output of the logic circuit $3_3$, and an output of the second flip flop $3_2$ is connected to the seek pattern output terminal.

In this case, it is assumed that symbol A denotes a seek pattern which is input to the seek pattern input terminal, symbol B represents a seek pattern which is output from the first flip flop $3_1$, symbol C' represents a seek pattern which is output from the logic circuit $3_3$, and symbol C represents a seek pattern supplied to the seek pattern output terminal. Logical states of the seek patterns A, B, C', and C are shown in FIG. 2B.

Figure 3:
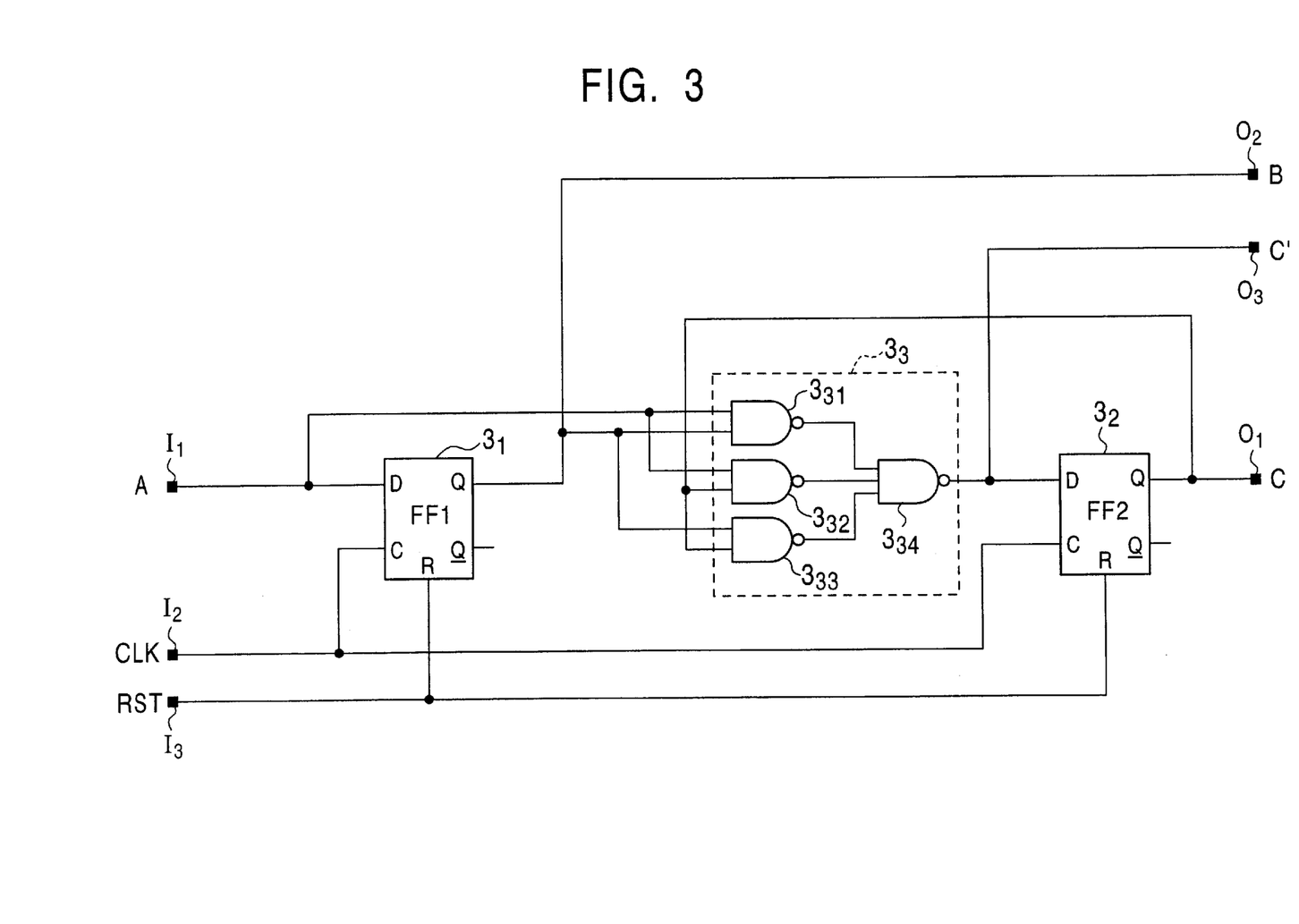
FIG. 3 is a circuit diagram of the structure of the seek pattern shaping circuit shown in FIG. 1.

FIG. 3 shows the structure of the seek pattern shaping circuit 3 shown in FIG. 1. In FIG. 3, only one of two channel systems is shown (the other channel system is not shown) in order to simplify the description.

Referring to FIG. 3, the same reference numerals are given to components corresponding to those in FIG. 2A, and descriptions of the common portions are omitted.

As shown in FIG. 3, the logic circuit $3_3$ includes a first NAND gate $3_{31}$, a second NAND gate $3_{32}$, a third NAND gate $3_{33}$, and a fourth NAND gate $3_{34}$.

Concerning the first flip flop $3_1$, a data input D is connected to a seek pattern input terminal $I_1$, a clock input C is connected to a clock signal input terminal $I_2$, and a reset input R is connected to a reset signal input terminal $I_3$. A non-inverted output Q is connected to the other input of the first NAND gate $3_{31}$ to one input of the third NAND gate $3_{33}$, and to a second seek pattern output terminal $O_2$. Concerning the second flip flop $3_2$, a data input D is connected to an output of the fourth NAND gate $3_{34}$ and to a third seek pattern output terminal $O_3$, a clock input C is connected to the clock signal input terminal $I_2$, a reset input R is connected to the reset signal input terminal $I_3$, and a non-inverted output Q is connected to a seek pattern output terminal $O_1$. Concerning the logic circuit $3_3$, one input of the first NAND gate $3_{31}$ is connected to the seek pattern input terminal $I_1$, and an output is connected to a first input of the fourth NAND gate $3_{34}$. Concerning the second NAND gate $3_{32}$, one input is connected to the seek pattern input terminal $I_1$, the other input is connected to the seek pattern output terminal $O_1$, and an output is connected to a second input of the fourth NAND gate $3_{34}$. Concerning the third NAND gate $3_{33}$, the other input is connected to the seek pattern output terminal $O_1$, and an output is connected to a third input of the fourth NAND gate $3_{34}$.

In this case, seek pattern A is supplied to the seek pattern input terminal $I_1$, clock signal CLK is supplied to the clock signal input terminal $I_2$, and reset signal RST is supplied to the reset signal input terminal $I_3$. The clock signal CLK comprises clock pulses. Seek pattern C is output from the seek pattern output terminal $O_1$, seek pattern B is output from the second seek pattern output terminal $O_2$, and seek pattern C' is output from the third seek pattern output terminal $O_3$.

Figure 4:
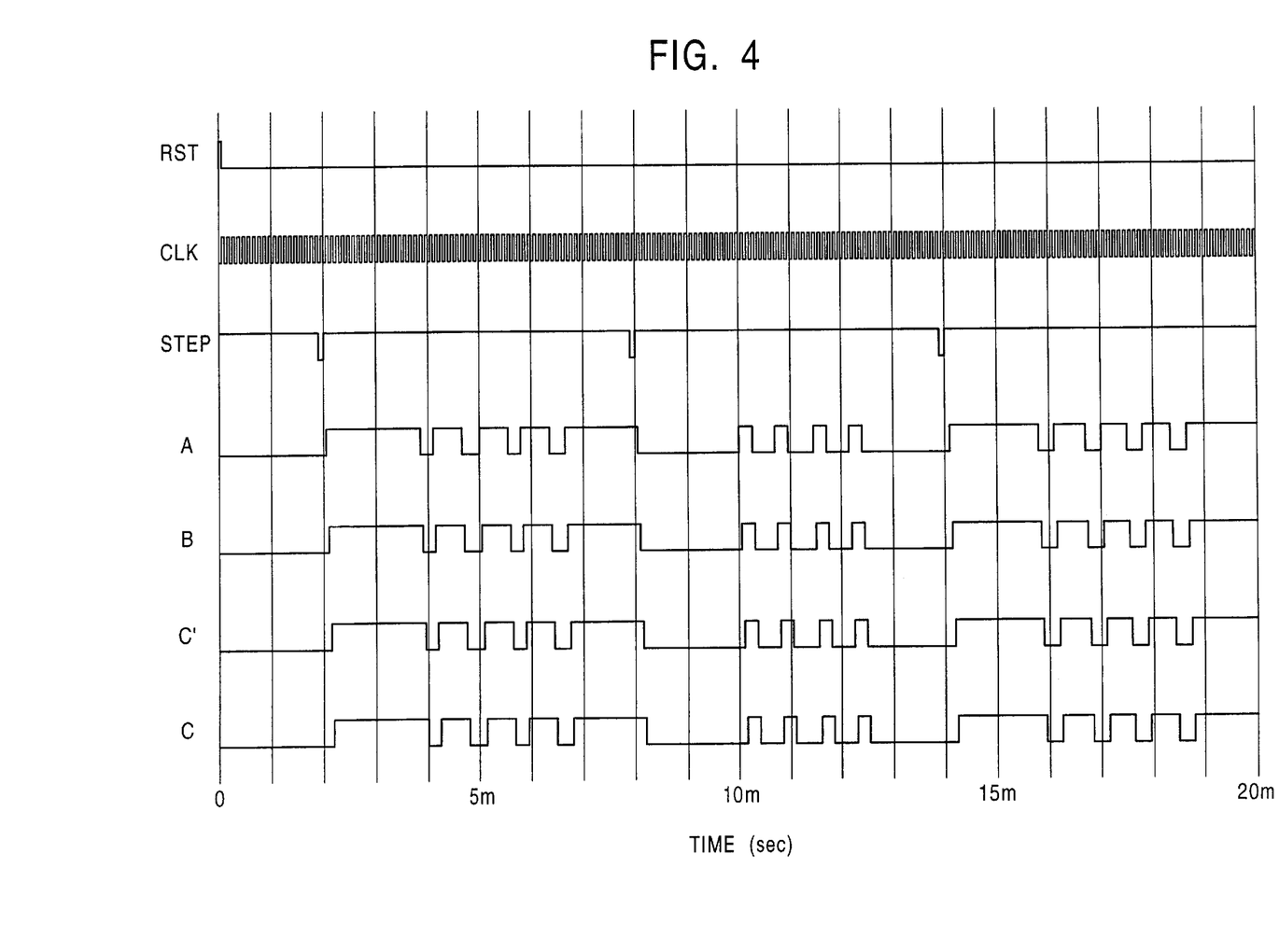
FIG. 4 is a characteristic diagram of an example of the seek pattern shaping operation of the seek pattern shaping circuit shown in FIG. 1
Figure 5:
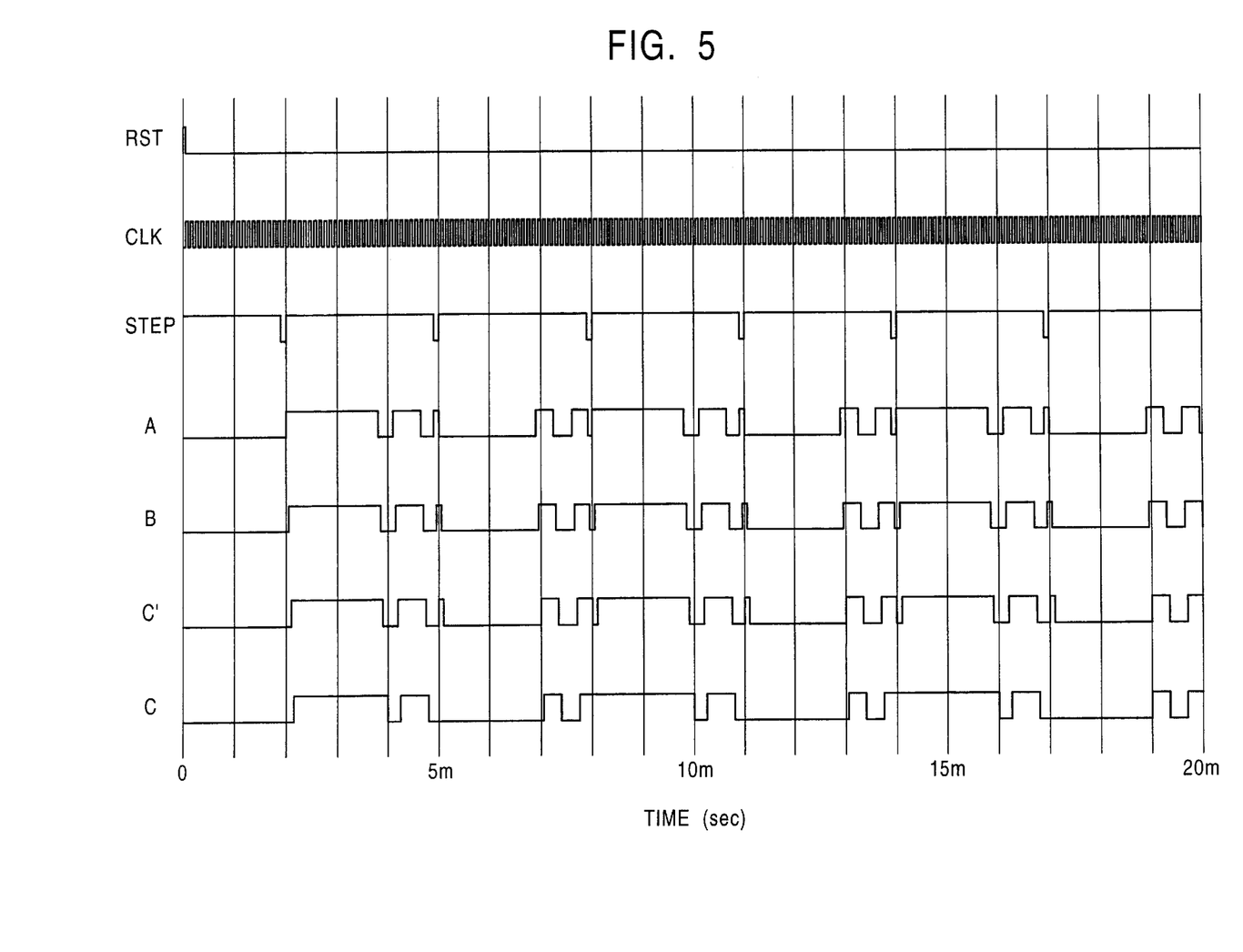
FIG. 5 is a characteristic diagram of another example of the seek pattern shaping operation of the seek pattern shaping circuit shown in FIG. 1.

FIGS. 4 and 5 show characteristics of the operation of the seek pattern shaping circuit 3 which shapes a seek pattern. FIG. 4 shows a case in which the period for which the step pulse is applied is longer than the period for which the seek pattern is generated, i.e. the frequency at which the step pulse is applied and/or detected is lower than the frequency of generation of the seek pattern. FIG. 5 shows a case in which the period for which the step pulse is applied is shorter than the period for which the seek pattern is generated, i.e. the frequency at which the step pulse is applied and/or detected is higher than the frequency of generation of the seek pattern.

In FIGS. 4 and 5, the time in milliseconds is shown on the abscissa, and amplitude is plotted on the ordinate. The first waveform from the top shows the waveform of reset signal RST, the second waveform shows the waveform of clock signal CLK, the third waveform shows the waveform of step pulse STEP, the fourth waveform shows the waveform of seek pattern A, the fifth waveform shows the waveform of seek pattern B, the sixth waveform shows the waveform of seek pattern C', and the seventh waveform shows the waveform of seek pattern C.

As shown in FIG. 4, when the period for which the step pulse is applied (approximately 6 ms in the example shown in FIG. 4) is longer than the period for which the seek pattern is generated (5 ms in the example shown in FIG. 4), one step pulse STEP is applied to the step pulse generation circuit 2. In response to this, the step pulse generation circuit 2 sequentially generates a pulse train which forms a seek pattern A. After this seek pattern A is supplied to the seek pattern input terminal $I_1$ of the seek pattern shaping circuit 3, the next step pulse STEP is applied to the step pulse generation circuit 2. At this moment, the step pulse generation circuit 2 has completed generating the pulse train which forms the seek pattern. Thus, seek pattern A supplied to the seek pattern shaping circuit 3 includes all of a predetermined number (the total number of high-level and low-level pulses) of pulses (nine pulses in the example shown in FIG. 4) every period for which the step pulse STEP is applied, and all the pulses each have a predetermined pulse width. When such a seek pattern A is supplied to the seek pattern shaping circuit 3, the seek pattern shaping circuit 3 is designed to slightly delay the seek pattern A. As a result, seek pattern C output from the seek pattern output terminal $O_1$, seek pattern B output from the second seek pattern output terminal $O_2$, and seek pattern C' output from the third seek pattern output terminal $O_3$ each have the same waveform as that of seek pattern A.

As shown in FIG. 5, when the period for which the step pulse is applied (approximately 3 ms in the example shown in FIG. 5) is shorter than the period for which the seek pattern is generated (5 ms), one step pulse STEP is applied to the step pulse generation circuit 2. In response to this, the step pulse generation circuit 2 sequentially generates a pulse train which forms a seek pattern A. After this seek pattern A is supplied to the seek pattern input terminal $I_1$ of the seek pattern shaping circuit 3, the next step pulse STEP is applied to the step pulse generation circuit 2. At this moment, the step pulse generation circuit 2 has not yet completed generating the pulse train which forms the seek pattern. Thus, seek pattern A supplied to the seek pattern shaping circuit 3 includes only five pulses, although seek pattern A is supposed to include a predetermined number (the total number of high-level and low-level pulses) of pulses, that is, nine pulses, every period for which the step pulse STEP is applied.

In addition, the last pulse width is narrower than the predetermined pulse width of the pulse abruptly terminated by the new step pulse. When such a seek pattern A is supplied to the seek pattern shaping circuit 3, the seek pattern shaping circuit 3 is designed to eliminate narrow pulses. When the pulse width of each narrow pulse is narrower than the width of one clock pulse CLK, the entire narrow pulse is eliminated. When the pulse width of each narrow pulse is narrower than the width of two clock pulses CLKs and is equal to or larger than the width of one clock pulse CLK, the narrow pulse is eliminated 50% of the time. This is to say that, as long as the narrow pulse overlaps with only one of the triggering edges of the clock signal CLK, the narrow pulse may be eliminated. The triggering edges are usually the rising edge of the clock pulse CLK and trigger operation of the flip flop. As a result, seek pattern C output from the seek pattern output terminal $O_1$ is a pattern in which narrow pulses are eliminated from seek pattern A. In this case, seek pattern B output from the second seek pattern output terminal $O_2$ and seek pattern C' output from the third seek pattern output terminal $O_3$ each include narrow pulses, as in seek pattern A.

In view of a narrow-pulse rejection ratio of the seek pattern shaping circuit 3, seek pattern C output from the seek pattern output terminal $O_1$ includes a few narrow pulses. However, the residual narrow pulses in seek pattern C each have a relatively large width, which is close to the width of two clock pulses CLKs. Thus, the possibility of the residual narrow pulses inducing noise is low. In particular, it is less likely that the residual narrow pulses will cause a malfunction in the stepping motor driver 6.

Figure 6:
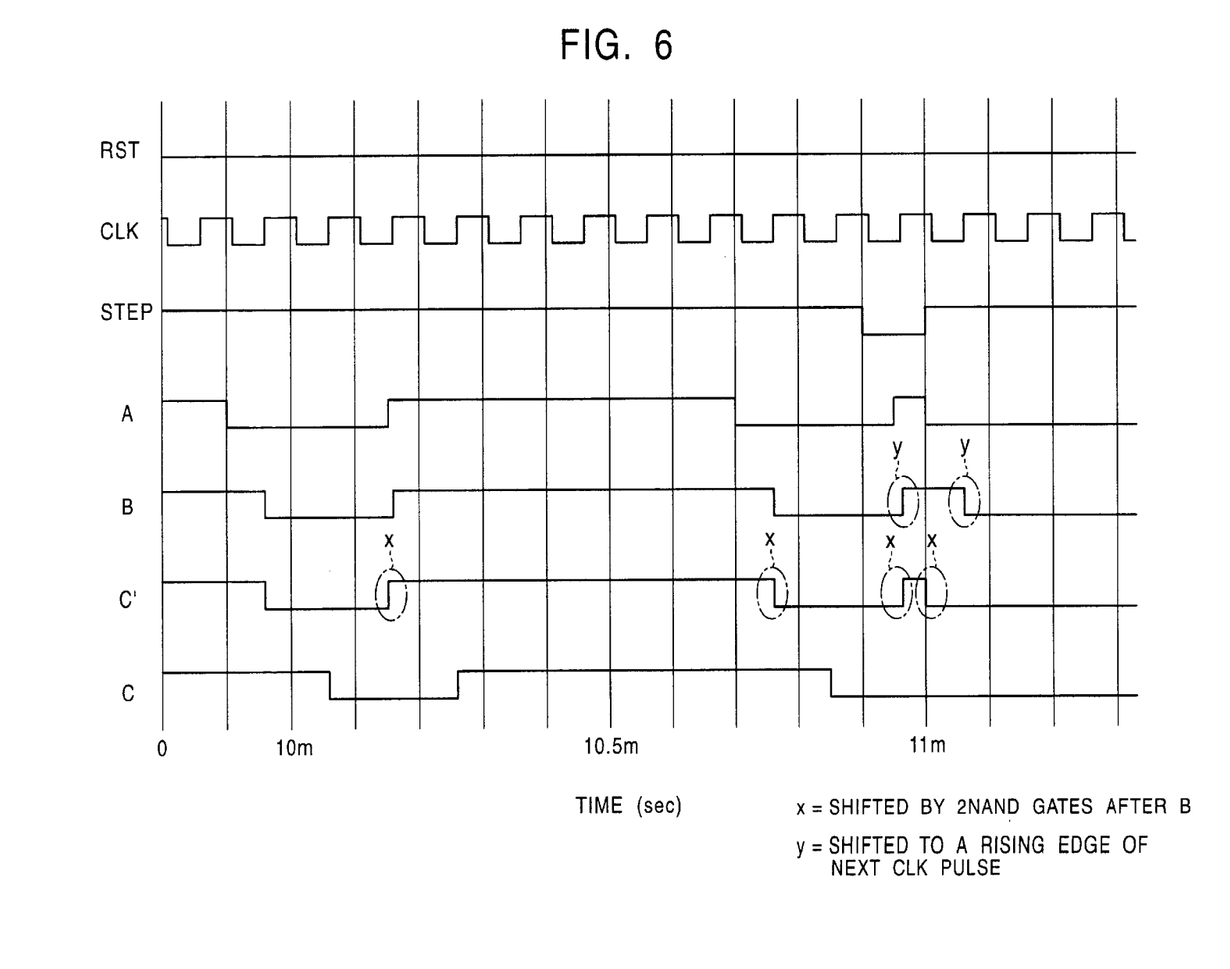
FIG. 6 is a characteristic diagram showing an enlarged view of a portion of the characteristic diagram shown in FIG. 5.

FIG. 6 is a characteristic diagram showing an enlarged view of a portion of the characteristic diagram shown in FIG. 5 over a range of 1 ms.

Referring to FIG. 6, the time in milliseconds is shown on the abscissa, and amplitude is plotted on the ordinate. The first to seventh waveforms from the top show waveforms corresponding to those in FIG. 5.

As shown in FIG. 6, seek pattern C output from the seek pattern output terminal $O_1$ is a pattern obtained by eliminating narrow pulses from seek pattern A. In contrast, seek pattern B output from the second seek pattern output terminal $O_2$ and seek pattern C' output from the third seek pattern output terminal $O_3$ each include narrow pulses, as in seek pattern A.

According to the seek pattern formation circuit of this embodiment, only narrow pulses in an input seek pattern are eliminated. As a result, narrow pulses which may induce noise are prevented from being supplied to a stepping motor driver, and hence a malfunction in the stepping motor driver is prevented.

Note that analog methods may be used, in addition to the digital method described above, to determine whether any narrow pulses exist. For example, one skilled in the art may apply the pulses to a capacitor(s), which charges during the pulse, and subsequently compare the charged voltage to a predetermined voltage set independently (or using a previous pulse). Of course, this may require that the digital signals are suitably delayed in the seek pattern formation circuit to overcome any subsequent logic problems for the stepping motor driver.

Furthermore, a signal of less than an arbitrary wider width may be wholly or partially eliminated by the addition of other elements. For example, to partially eliminate signals having a width of less than three clock pulses and at least two clock pulses, only one additional flip flop may be added.

Many different embodiments of the present invention may be constructed without departing from the spirit and scope of the present invention. It should be understood that the present invention is not limited to the specific embodiments described in this specification. To the contrary, the present invention is intended to cover various modification and equivalent arrangements included within the spirit and scope of the invention as hereafter claimed. The scope of the following claims is to be accorded the broadest interpretation so as to encompass all such modifications, equivalent structures and functions.

What is claimed is:

1. A seek pattern formation circuit comprising:
   a seek pattern generation circuit to generate a seek pattern having a predetermined pulse train every time a step pulse is applied, the pulse train including pulses having normal pulse widths; and
   a seek pattern shaping circuit to shape the seek pattern generated by said seek pattern generation circuit into a shaped seek pattern;
   wherein, when a period for which the step pulse is supplied is shorter than a period for which the seek pattern is generated, and when at least one of the pulses included in the pulse train of the seek pattern is narrower than the normal pulse width of the at least one of the pulses, said seek pattern shaping circuit selectively eliminates the at least one narrow pulse.

2. A seek pattern formation circuit according to claim 1, further comprising a clock signal having clock pulses supplied to the seek pattern generation circuit and the seek pattern shaping circuit, wherein the narrow pulse is narrower than a width of two clock pulses.

3. A seek pattern formation circuit according to claim 1, further comprising a clock signal having clock pulses supplied to the seek pattern generation circuit and the seek pattern shaping circuit, each clock pulse having a triggering edge, the narrow pulse being eliminated if overlapping fewer than two triggering edges.

4. A seek pattern formation circuit according to claim 1, further comprising a clock signal having clock pulses supplied to the seek pattern generation circuit and the seek pattern shaping circuit, wherein the narrow pulse is narrower than a width of a single clock pulse.

5. A seek pattern formation circuit according to claim 1, the seek pattern shaping circuit comprising a first flip flop into which the pulse train from the seek pattern generation circuit is input, a second flip flop from which the shaped seek pattern is output, and logic disposed between the first and second flip flops through which data flows from the first flip flop to the second flip flop.

6. A seek pattern formation circuit according to claim 5, the seek pattern shaping circuit further comprising feedback from an output of the seek pattern shaping circuit to an input to the logic.

7. A seek pattern formation circuit according to claim 1, the seek pattern shaping circuit comprising feedback between an output of the seek pattern shaping circuit and the seek pattern shaping circuit.

8. A seek pattern formation circuit according to claim 1, wherein the seek pattern and shaped seek pattern have the same number of pulses with each pulse having substantially the same width when the period for which the step pulse is supplied is at least the period for which the seek pattern is generated.

9. A stepper apparatus comprising the seek pattern formation circuit according to claim 1, a stepping motor driver supplied with the shaped seek pattern, and a stepper motor driven by the stepper motor driver.

10. A floppy disc drive comprising the stepper apparatus of claim 9.

11. A computer comprising the floppy disc drive of claim 10.

12. A seek pattern formation circuit comprising:
a seek pattern generation circuit to receive successive step pulses and generate a predetermined pulse train of pulses in response to each step pulse; and
a seek pattern shaping circuit to eliminate a pulse of an existing pulse train terminated by application of a successively applied step pulse.

13. A seek pattern formation circuit according to claim 12, further comprising a clock signal having clock pulses supplied to the seek pattern generation circuit and the seek pattern shaping circuit, the terminated pulse being eliminated if narrower than two clock pulses.

14. A seek pattern formation circuit according to claim 12, further comprising a clock signal having clock pulses supplied to the seek pattern generation circuit and the seek pattern shaping circuit, each clock pulse having a triggering edge, the terminated pulse being eliminated if overlapping fewer than two triggering edges.

15. A seek pattern formation circuit according to claim 12, further comprising a clock signal having clock pulses supplied to the seek pattern generation circuit and the seek pattern shaping circuit, the terminated pulse being eliminated if narrower than one clock pulse.

16. A seek pattern formation circuit according to claim 12, the seek pattern shaping circuit comprising a first flip flop into which the pulse train from the seek pattern generation circuit is input, a second flip flop from which a shaped seek pattern is output, and logic disposed between the first and second flip flops through which data flows from the first flip flop to the second flip flop.

17. A seek pattern formation circuit according to claim 16, the seek pattern shaping circuit further comprising feedback from an output of the seek pattern shaping circuit to an input to the logic.

18. A seek pattern formation circuit according to claim 12, the seek pattern shaping circuit comprising feedback between an output of the seek pattern shaping circuit and the seek pattern shaping circuit.

19. A seek pattern formation circuit according to claim 12, wherein the seek pattern and a shaped seek pattern output from the seek pattern shaping unit have the same number of pulses with each pulse having substantially the same width when a frequency of the step pulses is at most a frequency at which the seek pattern is generated.

20. A stepper apparatus comprising the seek pattern formation circuit according to claim 12, a stepping motor driver supplied with a shaped seek pattern output from the seek pattern shaping unit, and a stepper motor driven by the stepper motor driver.

21. A floppy disc drive comprising the stepper apparatus of claim 20.

22. A computer comprising the floppy disc drive of claim 21.

23. A method of decreasing error in positioning of a head in a floppy disc drive, the method comprising:
applying a step pulse at a predetermined frequency;
generating a seek pattern after the step pulse is applied;
shaping the seek pattern by eliminating a pulse in the seek pattern that is narrower than a predetermined width when the predetermined frequency is higher than a frequency at which the seek pattern is generated; and
supplying the shaped seek pattern to a stepping motor driver.

24. The method of claim 23, further comprising supplying clock pulses and eliminating the pulse only when the pulse is narrower than a width of two clock pulses.

25. The method of claim 23, further comprising supplying clock pulses with triggering edges and eliminating the pulse only when the pulse overlaps fewer than two triggering edges.

26. The method of claim 12, further comprising eliminating the pulse only when the pulse is narrower than a width of a single clock pulse.

27. The method of claim 23, further comprising shaping the seek pattern only when the predetermined frequency is higher than a frequency at which the seek pattern is generated.

28. The method of claim 23, the shaping of the seek pattern further comprising providing feedback between the seek pattern and the shaped seek pattern.

* * * * *